(12) United States Patent
Lutter

(10) Patent No.: US 11,225,994 B2
(45) Date of Patent: Jan. 18, 2022

(54) SCREW FASTENER ARRANGEMENT AND WASHER ASSEMBLY THEREFOR

(71) Applicant: Heico Befestigungstechnik GmbH, Ense-Niederense (DE)

(72) Inventor: Frank Lutter, Welver-Stocklarn (DE)

(73) Assignee: HEICO BEFESTIGUNGSTECHNIK GMBH, Ense-Niederense (DE)

( * ) Notice: Subject to any disclaimer, the term of this patent is extended or adjusted under 35 U.S.C. 154(b) by 221 days.

(21) Appl. No.: 16/096,463

(22) PCT Filed: Jun. 19, 2017

(86) PCT No.: PCT/EP2017/064942
§ 371 (c)(1),
(2) Date: Oct. 25, 2018

(87) PCT Pub. No.: WO2017/220495
PCT Pub. Date: Dec. 28, 2017

(65) Prior Publication Data
US 2019/0120281 A1    Apr. 25, 2019

(30) Foreign Application Priority Data

Jun. 24, 2016   (DE) .......................... 202016103361.6

(51) Int. Cl.
*F16B 39/24*   (2006.01)
*F16B 43/00*   (2006.01)
*F16B 39/282*  (2006.01)

(52) U.S. Cl.
CPC ............ *F16B 39/24* (2013.01); *F16B 43/001* (2013.01); *F16B 39/282* (2013.01)

(58) Field of Classification Search
CPC ........ F16B 39/24; F16B 43/001; F16B 43/00; F16B 39/14; F16B 37/0842; F16B 41/002; F16J 15/10

(Continued)

(56) References Cited

U.S. PATENT DOCUMENTS 2,070,291 A * 2/1937 McHugh ............. F16L 19/0218
285/55
2,492,115 A * 12/1949 Crowther .............. F16B 41/002
411/353

(Continued)

FOREIGN PATENT DOCUMENTS

CN    202158187 U    3/2012
GB    728196 A  *  4/1955   .............. F16B 39/24

(Continued)

OTHER PUBLICATIONS

Office Action dated Feb. 3, 2020 in related Chinese application 201780037373.8.

(Continued)

*Primary Examiner* — Victor D Batson
*Assistant Examiner* — Amit Singh Dhillon
(74) *Attorney, Agent, or Firm* — Polson Intellectual Property Law, PC; Margaret Polson; Christopher Sylvain

(57) ABSTRACT

A screw fastener arrangement comprising a screw fastener, with a head and a shank, and at least one washer on the shank. A coupling sleeve is in the washer opening through which the shank passes, the coupling sleeve having a U-shaped profile which opens radially outward and is formed by two flanges spaced from each other and protruding radially outward, the coupling sleeve being held interlockingly with the at least one washer by the flange in the direction of the longitudinal axis of the washer opening. The coupling sleeve has clamping catches projecting radially inward and elastically adjustable in the direction of their longitudinal axis against the interior wall of the coupling sleeve, which, using their free end, engage in an undercut of the screw fastener, acting in a longitudinally axial direction to the coupling sleeve. Also disclosed is a washer assembly for such an arrangement.

12 Claims, 2 Drawing Sheets

(58) Field of Classification Search
USPC .......................................................... 411/533
See application file for complete search history.

(56) References Cited

U.S. PATENT DOCUMENTS

| | | | | |
|---|---|---|---|---|
| 3,215,025 | A * | 11/1965 | Kramer | F16B 37/0842 411/521 |
| 3,285,313 | A * | 11/1966 | Blakesley | F16B 39/24 411/149 |
| 3,417,802 | A * | 12/1968 | Oldenkott | F16B 43/009 411/134 |
| 3,521,892 | A * | 7/1970 | Gulick | F16L 23/18 277/611 |
| 4,538,313 | A * | 9/1985 | Frieberg | B21D 53/20 411/149 |
| 4,911,594 | A * | 3/1990 | Fisher | F16B 37/0842 411/437 |
| 5,207,535 | A * | 5/1993 | Saab | E21D 21/0086 405/259.1 |
| 5,409,338 | A * | 4/1995 | McKinlay | F16B 39/282 411/149 |
| 5,620,290 | A * | 4/1997 | Homfeldt | F16B 39/108 411/162 |
| 5,707,193 | A * | 1/1998 | Hasegawa | F16B 37/0842 411/366.1 |
| 6,347,915 | B1 * | 2/2002 | Balzano | F16B 39/282 411/149 |
| 7,613,012 | B2 * | 11/2009 | Hung | F16B 21/186 361/803 |
| 7,690,698 | B1 * | 4/2010 | Curran | F16L 21/005 285/367 |
| 7,950,886 | B2 * | 5/2011 | Siegal | F16B 39/22 411/107 |
| 7,963,775 | B2 * | 6/2011 | Reisinger | H01R 12/7052 439/67 |
| 8,069,996 | B2 * | 12/2011 | Wu | B25H 3/04 211/70.6 |
| 2005/0095085 | A1 * | 5/2005 | Winker | F16B 39/26 411/533 |
| 2005/0135896 | A1 * | 6/2005 | Teal | F16B 37/0842 411/183 |
| 2008/0014046 | A1 * | 1/2008 | Bauer | F16B 39/282 411/164 |
| 2011/0318135 | A1 * | 12/2011 | Mellyn | F16B 37/0807 411/172 |
| 2013/0071205 | A1 * | 3/2013 | Kuehn | F16B 21/20 411/511 |
| 2013/0101371 | A1 * | 4/2013 | Spijker | F16B 37/0842 411/174 |
| 2013/0294867 | A1 * | 11/2013 | Gagne | F16B 37/0842 411/511 |
| 2015/0176627 | A1 * | 6/2015 | Schneider | F16B 39/24 29/525.02 |
| 2016/0264198 | A1 * | 9/2016 | Laurenzo | F16B 43/00 |
| 2018/0299042 | A1 * | 10/2018 | Ishibashi | F16J 15/0818 |

FOREIGN PATENT DOCUMENTS

| | | |
|---|---|---|
| JP | S46-12100 | 4/1971 |
| JP | S49-57744 | 6/1974 |
| JP | S55-18610 A | 2/1980 |
| JP | S61177216 A | 8/1986 |
| JP | S6217417 A | 1/1987 |
| JP | H03 98313 U | 10/1991 |
| JP | 2005226692 A | 8/2005 |
| JP | 2005264998 A | 9/2005 |
| JP | 2007504409 A | 3/2007 |
| JP | 2012006843 A | 1/2012 |
| JP | 2014047901 A | 3/2014 |
| WO | 2005024253 A1 | 3/2005 |

OTHER PUBLICATIONS

International Search report dated Dec. 28, 2017 in parent International application PCT/EP2017/064942.
International Preliminary Report on Patentability, Chapter II, dated Nov. 7, 2018 in parent International application PCT/EP2017/064942.
Office Action dated Feb. 4, 2020 in related Japanese application 2019-520472.

* cited by examiner

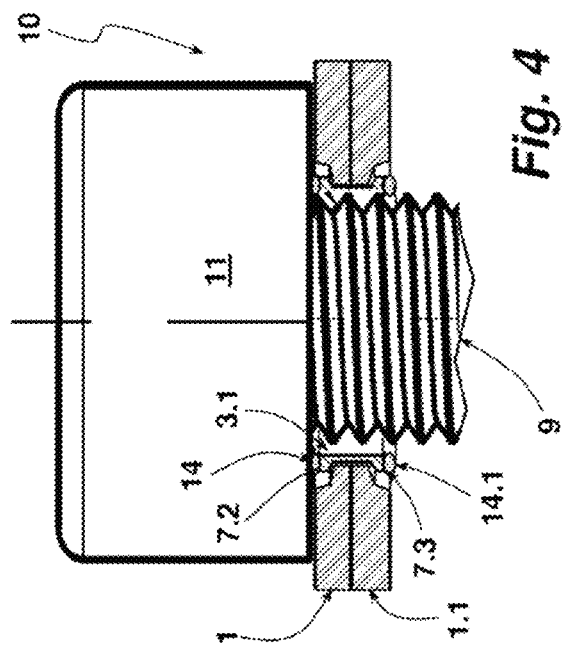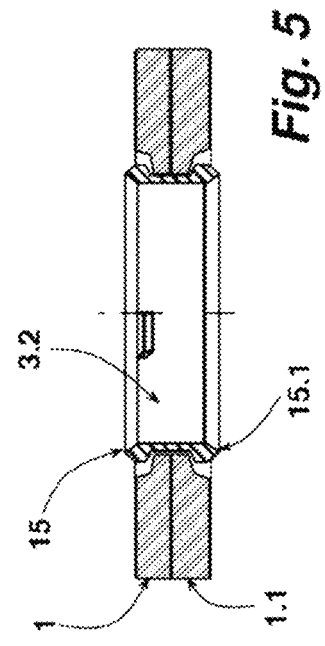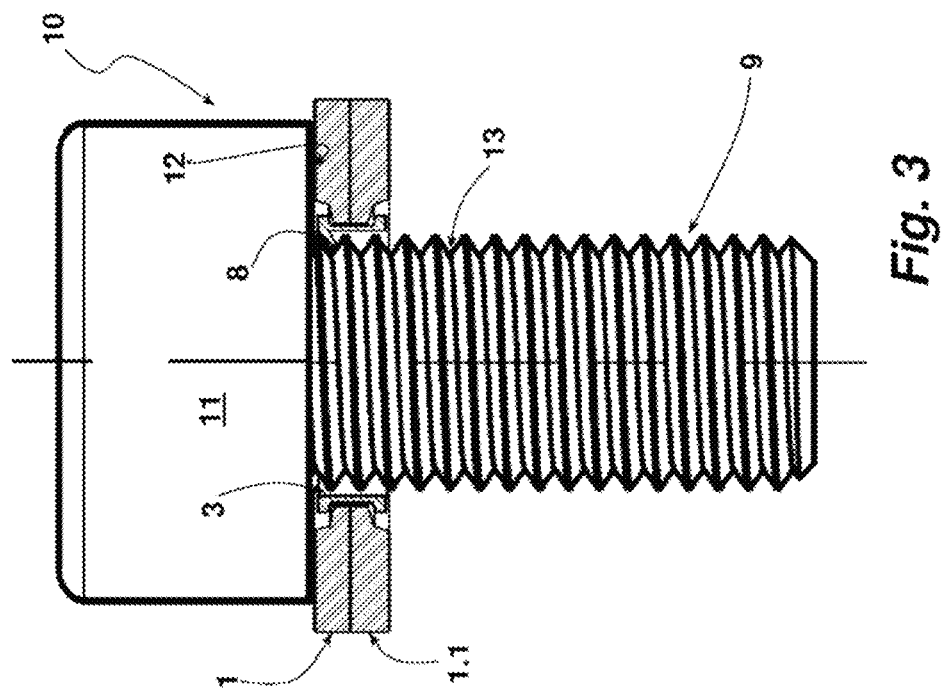

SCREW FASTENER ARRANGEMENT AND WASHER ASSEMBLY THEREFOR

BACKGROUND

The present disclosure relates to a screw fastener arrangement comprising a screw fastener, with a head having a ring-shaped washer contact surface and a shank, and at least one washer on the shank of the screw fastener. Furthermore, the invention relates to a washer assembly for a screw fastener.

Fasteners are used for clamping of two or more objects to one another, wherein typically two fasteners are designed to be complementary to one another, such as for example in the case of screw fasteners and thus in the case of a screw and a nut. In order to improve the introduction of force from the underside of the screw head—the same applies for the side of the nut facing the object to be clamped—into the part or parts to be clamped, in many cases washers are inserted between the screw head and the surface of the object against which the screw head is to be clamped. These washers can be flat washers or also lock washers. Lock washers are used when undesirable loosening of such a screw fastener should be prevented.

In order to simplify assembly of a screw fastener on site and in order to prevent situations where, during clamping of a plurality of fasteners, the user has forgotten to arrange a washer—either as a flat washer or as a lock washer—below the screw head, screws have been developed which have a washer retained undetachably on the screw shank. This is achieved in that the washer to be arranged below the screw head is fitted onto the screw shank, which is unrolled with regard to the thread formation, and only after this fitting the thread is rolled. The external diameter of the rolled thread is greater than the diameter of the opening of the washer, which, due to the thread, is then located on the shank below the screw head and thus is undetachably connected to the fastener.

A disadvantage of this design is that the washers are located on the screw shank during the thread rolling process. If these washers are lock washers, there is a danger that securing elements of the washer are damaged during the rolling of the thread between the rolling plates. In the case of flat washers, grooves or other kinds of damage can ensue, so that in this way the contact surface provided is reduced. Moreover, the production of such a screw with a washer connected thereto is economically viable only if a sufficiently large number of screws are produced. It should also be borne in mind that screws with one and the same nominal diameter are produced with varied lengths. This means that a manufacturer must produce and stock corresponding quantities of screws of different lengths with corresponding quantities of washers connected thereto. For reasons of cost, this previously known concept could not be employed in small batches.

The foregoing examples of the related art and limitations therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tool and methods which are meant to be exemplary and illustrative, not limiting in scope. In various embodiments, one or more of the above described problems have been reduced or eliminated, while other embodiments are directed to other improvements.

Starting from this discussed prior art, one aspect of the present disclosure is to propose a fastener with at least one washer connected to the fastener and having an opening, by which fastener the demonstrated disadvantages of the prior art discussed above are at least largely avoided.

This is achieved by a fastener in which a coupling sleeve is in the opening of the at least one washer through which the shank passes, the coupling sleeve having a U-shaped profile which opens radially outwards and is formed by two flanges spaced from each other and protruding radially outwards, the coupling sleeve being held interlockingly with the at least one washer by the flanges in the direction of the longitudinal axis of the washer opening, which coupling sleeve has a plurality of clamping catches projecting radially inward and elastically adjustable in the direction of their longitudinal axis against the interior wall of the coupling sleeve which, using their free end, engage in an undercut of the screw fastener, acting in a longitudinally axial direction to the coupling sleeve.

The at least one washer of this screw fastener is equipped with a coupling sleeve which is held interlockingly on the at least one washer in the longitudinal direction thereof. The coupling sleeve has a plurality of clamping catches projecting radially inwards. These catches are elastically adjustable in the longitudinal direction of the coupling sleeve against the inner wall of the coupling sleeve. The adjustability of the clamping catches typically results from the material used for the production of the coupling sleeve. For connection of the washer to the fastener, these clamping catches engage in an undercut acting in a longitudinally axial direction of the fastener. They may be, for example, two adjacent thread pitch turns of the shank of the screw fastener. During the engagement in the undercut of the screw fastener, the clamping catches act as latches. As a result of the elastic adjustability of the clamping catches, such a washer can be pushed onto the shank of a screw after the thread has been rolled. The clamping force with which the clamping catches are fixed in such a groove, for instance in a thread, is sufficiently high that the washer cannot be removed during a conventional handling of the screw fastener. It is certainly possible to design the coupling sleeve so that the washer can be withdrawn again by the use of some force from the fastener, for example the screw shank. According to one embodiment, it is provided that the clamping catches are inclined counter to their fitting direction on the shank of a screw, and then engage like barbs in the undercut acting in a longitudinally axial direction. Then the force required for fitting the washer onto the threaded shank is less, typically significantly less than the force which would have to be applied in order to remove the washer from the screw shank again. This removal is generally not necessary in any case. In some embodiments, the radial length of the clamping catches in an inclined design thereof can be so great that a removal of the washer assembly composed of the washer and the coupling sleeve is only possible with a plastic deformation of the clamping catches or destruction thereof.

Such a washer can also be fitted, for example, on a screw fastener designed as a nut, if this washer has a circumferential groove following its washer contact surface. Then the clamping catches engage in this groove.

An advantage of this design is that a screw with its thread can be produced completely independently and without taking into consideration a washer located on the screw shank. Moreover, in this design, only those screws which should be equipped with such a detachable washer are then equipped with a washer. Therefore, such a lock washer with its coupling sleeve is also suitable to a particular degree for creating fasteners with washers retained thereon in small batches.

The coupling sleeve surrounds the at least one washer with its flanges in the longitudinal direction of the opening in the washer. As a result, the coupling sleeve is connected to the washer interlockingly in said direction.

Ultimately, any washer can be connected to a fastener by such a coupling sleeve. This also includes lock washers of various types. In one embodiment, the surrounding of the at least one washer by the flanges of the coupling sleeve protruding outwards in the radial direction is used to hold together two washers of a wedge lock pair. In many cases, such wedge lock washers are glued together to form a pair of wedge lock washers, in order to ensure that these washers are assembled with their sides facing one another correctly. This gluing is not necessary when such a coupling sleeve is used, since the two wedge lock washers are held together by the flanges of the coupling sleeve that project over the washer surfaces which face away from one another.

In principle, the clamping catches can be arranged in different positions in relation to the height or longitudinal extent of the coupling sleeve. According to one embodiment, these catches are located at the upper end of the coupling sleeve, namely at the end which faces the washer contact surface of the fastener. If the fastener is a screw, then in such an embodiment the clamping catches engage in the thread run-out and thus in the space between the underside of the screw head and the start of the thread. Such an arrangement is advantageous if the clamping catches are inclined counter to the fitting movement direction for connection thereof to a fastener. Then the arrangement of the clamping catches on one end of the coupling sleeve simultaneously constitutes a coding and indicates which side of the arrangement of washer/washers and coupling sleeve is to be fitted to a fastener first. A fitting coding can also be provided in another way.

The clamping action of the clamping catches can be adjusted by the number of clamping catches which are typically arranged circumferentially with the same angular spacing relative to one another, the material of the coupling sleeve and thus typically also the material of the clamping catches, the connection geometry of the clamping catches to the other components of the coupling sleeve and/or the angle value over which each clamping catch extends. The greater this angle value is, the more rigidly a clamping catch reacts regarding its adjustability in the longitudinal direction of the opening of the coupling sleeve and the more force that must be applied in order to move it so far that the washer can be removed from the fastener. The connection geometry of the clamping catches to the other components of the coupling sleeve can be provided, for example, by a groove in order to achieve the required adjustability.

Even if, typically, the clamping catches are arranged at one and the same height with regard to the height of the coupling sleeve, it is possible to arrange the catches at different heights and thus in different positions with regard to the longitudinal extent of the coupling sleeve. This presupposes that the coupling sleeves are then connected to a screw fastener which has corresponding undercuts at different heights with regard to the longitudinal extent of the coupling sleeve. This configuration applies in the case of a screw being the screw fastener because of the thread extending over a certain longitudinal extent.

In the radial direction, the clamping catches preferably, but not necessarily, extend as far as the base of the groove of the fastener forming such an undercut, which is the screw core in the case of a screw. Clamping with such clamping catches is particularly effective if they are additionally inclined like barbs counter to the fitting direction. An adjustment of the clamping catches for removing the washer is then blocked by the base of the groove, so that the washer with its coupling sleeve can no longer be removed from the fastener without damage or destruction. Such a configuration of the coupling sleeve also enables the introduction of a groove in the root region of the clamping catches in order to achieve an adjustability counter to the fitting direction.

The coupling sleeve is preferably, but not necessarily, made of metal or plastic. In order to form the washer with its coupling sleeve, the coupling sleeve will be made of a material which is suitable with regard to the material of the fastener or fasteners and with regard to the clamped objects.

Another advantage of such a washer equipped with a coupling sleeve or such a multi-washer arrangement, for example a pair of wedge lock washers, equipped with a coupling sleeve is that the coupling sleeve can also be used as a seal. In such a case, the height of the coupling sleeve in the unclamped state of the fastener is greater than the thickness of the at least one washer, so that the outer faces of the flanges facing away from one another in the longitudinal direction are pressed onto the washer contact surfaces of the fastener—on the one hand—and the surface of the object to be clamped—on the other hand. In the case of a clamped fastener, its washer contact surface acts directly on the abutment and is clamped against this abutment. In this respect, the pressing force of the sealing surface results from the elastic restoring force of the seal and/or the coupling sleeve. Such a configuration of the coupling sleeve with sealing functionality allows an encapsulation of the thread and the thread opening of a fastener with the result that lubricant introduced therein remains permanently therein and is not washed out. For this reason, such a washer assembly, in which the coupling sleeve simultaneously forms a seal, can also be used for applications in which the thread must be encapsulated so that lubricants contained therein do not escape or are not washed out, for instance, by cleaning fluid. Thus, these fasteners can also be used in plants which process food products. Such fasteners can also be released again without problems, even after many years.

Because of the described sealing functionality of the coupling sleeve, washer assemblies, for example two wedge lock washers arranged as a pair of wedge lock washers, can be clamped and sealed without restricting the movability of the wedge lock washers with respect to one another, which is necessary for releasing such a pair of wedge lock washers, particularly in the axial direction.

The sealing effect of such a coupling sleeve can result from the material of the coupling sleeve itself. It is also possible to form a metallic seal, if the coupling sleeve is made of metal. Typically, in such a case, the material of the coupling sleeve is softer than that of the adjacent washer contact surface of the fastener and of the object to be clamped. It is also certainly possible to apply a sealing ring made of a different material, for example silicone (silicone bead), to the relevant front faces of the flanges of the coupling sleeve, or even to provide a separate sealing ring, preferably held by the coupling sleeve.

If the coupling sleeve simultaneously serves as a seal, the flanges protruding outwards in a radial direction are configured to be circumferential. If the coupling sleeve does not have a sealing function, the flanges can also be provided by a plurality of flange segments spaced apart from one another.

In addition to the exemplary aspects and embodiments described above, further aspects and embodiments will become apparent by reference to the accompanying drawings forming a part of this specification wherein like reference characters designate corresponding parts in the several views.

BRIEF DESCRIPTION OF THE DRAWINGS

The present disclosure is explained in greater detail below with reference to the appended drawings wherein:

FIG. 3 shows the pair of wedge lock washers, which are held together by the coupling sleeve, assembled on a screw, FIG. 4 shows a pair of wedge lock washers which are held together by a coupling sleeve according to a further embodiment, and FIG. 5 shows a pair of wedge lock washers which are held together by a coupling sleeve according to an embodiment corresponding to the embodiment of FIG. 4, but in a different embodiment.

Before further explaining the depicted embodiments, it is to be understood that the invention is not limited in its application to the details of the particular arrangements shown, since the invention is capable of other embodiments. It is intended that the embodiments and figures disclosed herein are to be considered illustrative rather than limiting. Also, the terminology used herein is for the purposes of description and not limitation.

DETAILED DESCRIPTION

Two wedge lock washers 1, 1.1 constitute a pair of wedge lock washers. The two wedge lock washers 1, 1.1 have wedge-shaped ribs inclined at a specific angle on their sides facing one another. Radial ribs which are typically of sawtooth-like configuration and interact with the respective abutment are provided on the sides facing away from one another for clamping with the respective abutment. In the illustrated embodiment, it is provided that the upper side 2 visible in FIG. 1 with its radial ribs is supported on the washer contact surface of a screw fastener. The wedge surface angle of the wedge surfaces of the wedge-shaped ribs of the wedge lock washers 1, 1.1 is greater than the pitch angle of the screw thread of the screw fastener used for producing a pretension.

Figure 1:
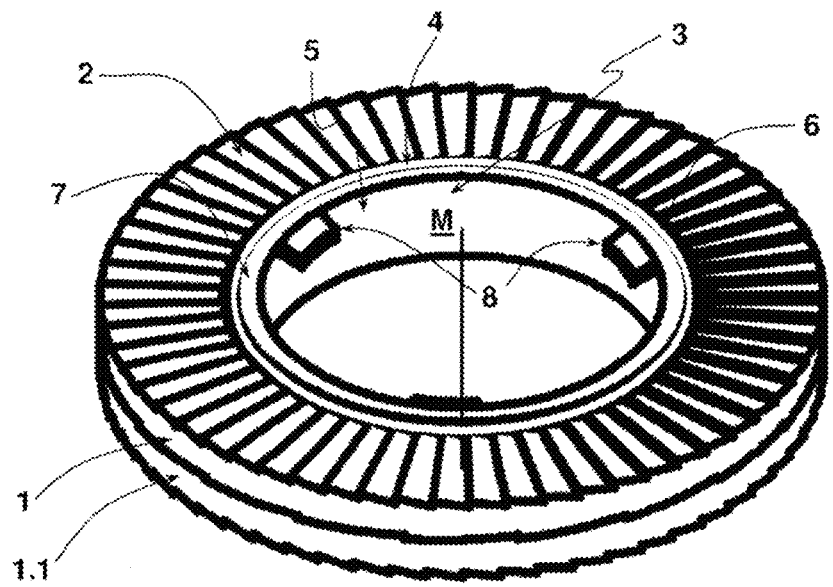
FIG. 1 shows a perspective view of a pair of wedge lock washers held together on the inside by a coupling sleeve.

The two wedge lock washers 1, 1.1 are held together by a coupling sleeve 3. In the illustrated embodiment, the coupling sleeve 3 is a plastic part which is produced by an injection molding process. The coupling sleeve 3 passes through the central openings 4 in the wedge lock washers 1, 1.1. The coupling sleeve 3 with its cylindrical inner peripheral surface surrounds an insertion opening 5. The insertion opening 5 serves for passage of a shank, such as a threaded shank of a screw fastener designed as a screw. On their upper sides facing away from one another, as can be seen in FIG. 1 with regard to the upper side 2, the wedge lock washers 1, 1.1 have a step 6 on their end portion facing their opening 4. The effective thickness of the respective wedge lock washer 1, 1.1 is reduced in the hole edge region by this step 6. A first circumferential flange 7 of the coupling sleeve 3 engages over this step 6. As can be seen from FIG. 2, the coupling sleeve 3 likewise has on its underside a circumferential outwardly protruding flange 7.1. Due to the two flanges 7, 7.1 spaced apart from one another, a U-shaped profile, which is open radially outwards, is formed to provide a receptacle in which the radially inwardly directed projections 6', 6.1' of the wedge lock washers 1, 1.1 formed by the steps 6, 6.1 engage.

In this way, the two wedge lock washers 1, 1.1 are held together by the coupling sleeve 3. In their position shown in the drawings, the wedge lock washers 1, 1.1 are not glued to one another on the sides thereof which support the wedge surfaces.

For connection of the pair of wedge lock washers to a screw fastener, which in the illustrated embodiment is configured as a screw, a plurality of clamping catches 8, which in the illustrated embodiment are arranged with the same angular spacing relative to one another, are formed on the inner peripheral surface M of the coupling sleeve 3. These catches are formed, protruding inwards, on the upper end of the coupling sleeve 3, as in the left-hand clamping catch 8 shown in FIG. 1 and with regard to the right-hand clamping catch 8 shown in FIG. 2. Moreover, the clamping catches 8 are inclined in the direction towards the end of the coupling sleeve 3 located opposite the insertion opening 5 in the longitudinally axial direction. The clamping catches 8 are inclined counter to a fitting movement direction by which the pair of wedge lock washers is connected with its coupling sleeve 3 to a screw fastener. The clamping catches 8 act like barbs when the coupling sleeve 3 is connected to a screw fastener, such that the clamping catches 8 engage correctly in an undercut acting in the longitudinally axial direction. The clamping catches 8 are elastically adjustable in the longitudinally axial direction of the opening 5 of the coupling sleeve 3. In the illustrated embodiment, this elastic adjustability results from the material used for producing the coupling sleeve 3. The thickness of the clamping catches 8 is adapted for engagement in an undercut of the screw fastener acting in the longitudinally axial direction to which the coupling ring 3 with its pair of wedge lock washers is to be connected. In the illustrated embodiment, it is provided that the clamping catches 8 engage behind the thread run-out of the threaded shank of a screw.

Figure 2:
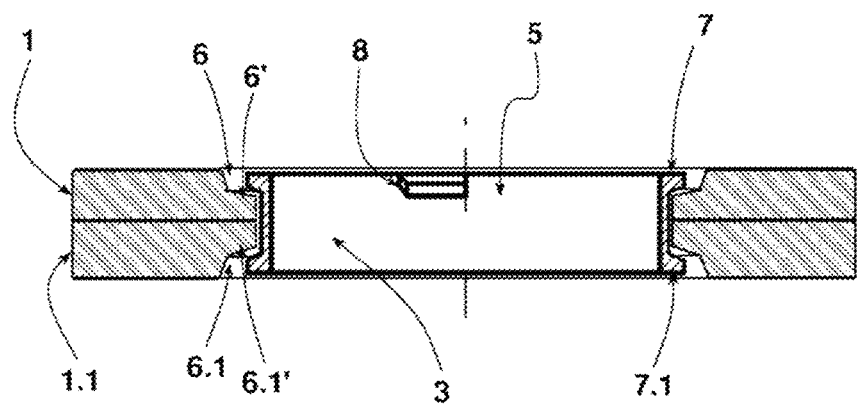
FIG. 2 shows a section through the arrangement of FIG. 1.

The sectional representation of FIG. 2 shows the configuration of the steps 6, 6.1 of the wedge lock washers 1, 1.1 in relation to the distance of the two flanges 7, 7.1 of the coupling sleeve 3 from one another and the projections 6', 6.1' thus formed. Between the side of the projection 6' facing the flange 7 and the side of the projection 6.1' facing the flange 7.1, there is sufficient free space so that the two wedge lock washers 1, 1.1 can be rotated with respect to one another on their wedge surfaces, whereby the effective height of the pair of wedge lock washers increases relative to the illustration in the drawings. In the illustrated embodiment, it is ensured in this way that the two wedge lock washers 1, 1.1 can be rotated with respect to one another without further action and the enlargement of the effective thickness of this pair of wedge lock washers is not hindered by flanges 7, 7.1 projecting over the projections 6', 6.1'.

FIG. 3 shows the pair of wedge lock washers formed from the wedge lock washers 1, 1.1 with the coupling sleeve 3 fitted on the threaded shank 9 of a screw 10. The clamping catches 8 engage between two adjacent thread pitch turns of the screw shank 9 in the longitudinal direction of the threaded shank 9 and hold the coupling sleeve 8 with its pair of wedge lock washers adjacent to the washer contact surface 12 formed by the underside of the screw head 11. The length of the clamping catches 8 in the radial direction is dimensioned so that, in the fitted position of the coupling sleeve 3 on the screw shank 9, the clamping catches are supported on or bear against the screw core 13. If the pair of wedge lock washers should be moved away from the screw head 11, the concomitant pivoting movement of the clamping catches 8 in the direction towards the screw head 11 is blocked by its support on the screw core 13. Pushing of the clamping catches 8 outwards in the radial direction is prevented by the support of the coupling sleeve 3 on the front faces of the wedge lock washer 1, 1.1 surrounding the respective opening. In this way, the pair of wedge lock washers with their coupling sleeve 3 can only be removed from the screw 10 by increased force.

Independent of the described embodiment, it is generally applicable that the movability of the clamping catches relative to the cylindrical portion of the coupling sleeve can be arranged by different means, such as for example the material used, the material thickness, the circumferential extent and the like, individually or in combination with one another. This enables an adjustment of the force necessary for removing the washers with their coupling sleeve from the screw fastener, that is to say, for example, from the threaded shank of a bolt. The clamping catches can certainly be designed so that removal of the washer assembly with its coupling sleeve is only possible by damage to or destruction of the clamping catches. In another embodiment in which the washer assembly, comprising the at least one washer and the coupling sleeve, should be removable, the retaining forces will be set correspondingly lower.

FIG. 4 shows a coupling sleeve 3.1, which in principle is constructed like the coupling sleeve 3 of the previously described drawings. Therefore, the statements made in connection therewith likewise apply to the coupling sleeve 3.1. The coupling sleeve 3.1 differs from the coupling sleeve 3 in that it has an additional sealing functionality in order to seal a thread channel. For this purpose, in the illustrated embodiment, the front faces of the flanges 7.2, 7.3 of the coupling sleeve 3.1 which face away from one another are equipped with a circumferential silicone bead 14, 14.1 as a sealant. The silicone bead 14 applied to the flange 7.2 acts against the underside of the screw head 11. The silicone bead 14.1 on the flange 7.3 of the coupling sleeve 3.1 acts against the upper side of a clamping abutment (not illustrated in the drawings). In this way, the thread channel in which the screw shank 9 of the screw 10 engages is effectively sealed.

FIG. 5 shows a coupling sleeve 3.2, which in principle is constructed like the coupling sleeve 3.1 and thus likewise has a sealing functionality. The coupling sleeve 3.2 of the embodiment according to FIG. 5 is made of a TPE material (thermoplastic elastomer material). This material is suitable to provide sealing. The shape retention is likewise sufficient, so that the coupling sleeve meets the set requirements for connection to the washer or the washer assembly. In contrast to the coupling sleeve 3.1 of the embodiment according to FIG. 4, in order to achieve the sealing functionality of the coupling sleeve 3.2, no additional silicone bead or the like is applied, but sealing lips 15, 15.1 are formed on the flanges of the coupling sleeve 3.2 which face away from one another. The effect of the sealing lips 15, 15.1 of the coupling sleeve 3.2 corresponds to that of the silicone beads 14, 14.1 of the embodiment according to FIG. 4.

It will be understood that, in order to enable this sealing functionality and thus the required pressure on the silicone beads 14, 14.1, the height of the coupling sleeve 3.1 is greater than the thickness of the pair of wedge lock washers before the screw fastener is clamped with the pair of wedge lock washers. In the region of its cylindrical portion on which the clamping force acts via the silicone bead 14, 14.1, the coupling sleeve 3.1 provides an effective abutment. Buckling outwards of the cylindrical annular portion located between the flanges 7.2, 7.3 is prevented by the contact of this portion of the coupling sleeve 3.1 on the front faces of the wedge lock washers 1, 1.1 facing inwards in the radial direction. A divergence in the direction towards the screw shank is prevented in that the internal diameter of the coupling sleeve 3 is greater than its external diameter only by a necessary clearance for introduction of the screw shank. The clearance between the flanges 7.2, 7.3 of the coupling sleeve 3.1 protruding outwards in the radial direction is used for the sealing functionality and the correct clamping of the screw fastener to its abutment. The coupling sleeve 3.1 is compressed by the tensioning force. The elastic restoring force induced in the coupling sleeve 3.1 by the compression is the force with which the silicone beads 14, 14.1 act against the complementary sealing surfaces. Thus, correct clamping, where the washer contact surface of the screw fastener acts directly on the surface of the adjacent wedge lock washer and the opposing surface of the other wedge lock washer acts against the clamping abutment, is not hampered in spite of the provision of a sealing functionality. The foregoing statements with regard to the sealing functionality of the coupling sleeve 3.1 apply likewise for the coupling sleeve 3.2 of the embodiment according to FIG. 5.

The invention has been explained with reference to the drawings of specific exemplary embodiments. Without departing from the scope of the applicable claims, numerous further embodiments for implementing the invention are apparent to a person skilled in the art. While a number of exemplary aspects and embodiments have been discussed above, those of skill in the art will recognize certain modifications, permutations, additions and sub-combinations therefore. It is therefore intended that the following appended claims hereinafter introduced are interpreted to include all such modifications, permutations, additions and sub-combinations, which are within their true spirit and scope. Each embodiment described herein has numerous equivalents.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims. Whenever a range is given in the specification, all intermediate ranges and subranges, as well as all individual values included in the ranges given are intended to be included in the disclosure. When a Markush group or other grouping is used herein, all individual members of the group and all combinations and sub-combinations possible of the group are intended to be individually included in the disclosure.

In general, the terms and phrases used herein have their art-recognized meaning, which can be found by reference to standard texts, journal references and contexts known to those skilled in the art. The above definitions are provided to clarify their specific use in the context of the invention.

LIST OF REFERENCES 1, 1.1 wedge lock washer
2 upper side 3, 3.1, 3.2 coupling sleeve
4 opening
5 insertion opening
6, 6.1 step
6', 6.1' projection
7, 7.1, 7.2, 7.3 flange
8 clamping catch
9 threaded shank
10 screw
11 head
12 washer contact surface
13 screw core
14, 14.1 silicone bead
15, 15.1 sealing lips
M peripheral surface

The invention claimed is:

1. A screw fastener arrangement comprising:
a screw fastener with a head and a shank, the head having a ring-shaped washer contact surface;
a pair of wedge lock washers on the shank of the screw fastener, the washers having a washer opening, and each washer having a step on an end portion facing the washer opening reducing an effective thickness of the washer in an edge region thereof adjacent the washer opening; and
a coupling sleeve arranged in the washer opening of the washers, the shank passes through an opening of the coupling sleeve, the coupling sleeve having a U-shaped profile which opens radially outwards and is formed by two flanges spaced from each other and protruding radially outwards, the coupling sleeve being held interlockingly with the washers by the flanges in a direction of a longitudinal axis of the washer opening due to the flanges overlapping the steps of the washers;
wherein a height of the coupling sleeve is greater than a thickness of the washers along the longitudinal axis of the washer opening, and portions of the coupling sleeve projecting over the thickness of the washers are deformable in order to provide a seal during clamping of the screw fastener without restricting movability of the washers with respect to one another;
wherein an interior wall of the coupling sleeve has a plurality of clamping catches projecting radially inwards into the opening of the coupling sleeve, each clamping catch elastically adjustable in a direction of a longitudinal axis through the clamping catch against the interior wall of the coupling sleeve, and a free end of each clamping catch opposite the interior wall engages in an undercut of the screw fastener acting in a longitudinally axial direction to the coupling sleeve.

2. The screw fastener arrangement of claim 1, wherein the clamping catches are arranged in a region of an end of the coupling sleeve facing the ring-shaped washer contact surface of the screw fastener.

3. The screw fastener arrangement of claim 1, wherein the clamping catches are inclined in projecting from the interior wall of the coupling sleeve to their free ends and face away from the ring-shaped washer contact surface of the screw fastener.

4. The screw fastener arrangement of claim 1, wherein an internal diameter of the opening of the coupling sleeve corresponds to an external diameter of the shank of the screw fastener passing through the opening of the coupling sleeve or of a complementary screw fastener interacting with the screw fastener.

5. The screw fastener arrangement of claim 1, wherein the coupling sleeve is a plastic part.

6. The screw fastener arrangement of claim 1, wherein the screw fastener is a screw and the shank is a screw shank having a thread, and the clamping catches of the coupling sleeve engage in the thread and/or thread run-out of the screw shank in order to hold the washers on the screw fastener.

7. The screw fastener arrangement of claim 6, wherein an internal diameter of the opening of the coupling sleeve in a region of the clamping catches, unadjusted, corresponds to a core diameter of the screw shank of the screw fastener.

8. A washer assembly for a screw fastener comprising:
a pair of wedge lock washers having a washer opening, each washer having a step on an end portion facing the washer opening reducing an effective thickness of the washer in an edge region thereof adjacent the washer opening;
a coupling sleeve arranged in the washer opening of the washers, the coupling sleeve having an opening for a male part of the screw fastener to pass through, the coupling sleeve having a U-shaped profile which opens radially outwards and is formed by two flanges spaced from each other and protruding radially outwards, the coupling sleeve being held interlockingly on the washers by the flanges in a direction of a longitudinal axis of the washer opening due to the flanges overlapping the steps of the washers;
wherein a height of the coupling sleeve is greater than a thickness of the washers along the longitudinal axis of the washer opening, and portions of the coupling sleeve projecting over the thickness of the washers are deformable in order to provide a seal during clamping of the screw fastener without restricting movability of the washers with respect to one another;
wherein the coupling sleeve has a plurality of clamping catches projecting radially inwards into the opening of the coupling sleeve, each clamping catch elastically adjustable in a direction of a longitudinal axis through the clamping catch, and a free end of each clamping catch is configured to engage in a clamping groove of the screw fastener open in a radial direction to the coupling sleeve.

9. The washer assembly of claim 8, wherein the clamping catches are arranged in a region of an end of the coupling sleeve which is configured to face a washer contact surface of the screw fastener.

10. The washer assembly of claim 9, wherein the clamping catches are inclined in projecting from the coupling sleeve to their free ends, and are configured to face away from a washer contact surface of the screw fastener.

11. The washer assembly of claim 8, wherein the portions of the coupling sleeve which project over the washers are designed as sealing lips.

12. The washer assembly of claim 8, wherein the coupling sleeve is a plastic part.

* * * * *